(12) United States Patent
Tsuda

(10) Patent No.: US 8,391,246 B2
(45) Date of Patent: Mar. 5, 2013

(54) RADIO COMMUNICATION TERMINAL, COMMUNICATION METHOD, AND RADIO COMMUNICATION SYSTEM

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 12/894,545

(22) Filed: Sep. 30, 2010

(65) Prior Publication Data

US 2011/0116395 A1    May 19, 2011

(30) Foreign Application Priority Data

Nov. 19, 2009    (JP) ................. 2009-264241

(51) Int. Cl.
*H04W 4/00* (2009.01)
(52) U.S. Cl. ...................................... 370/332
(58) Field of Classification Search .......... None
See application file for complete search history.

(56) References Cited

U.S. PATENT DOCUMENTS

| | | | |
|---|---|---|---|
| 5,784,695 A * | 7/1998 | Upton et al. .................. 455/442 |
| 5,960,335 A * | 9/1999 | Umemoto et al. ......... 455/226.2 |
| 6,771,963 B1 * | 8/2004 | Cheng et al. .................. 455/437 |
| 2004/0202146 A1 * | 10/2004 | Lee ................. 370/350 |
| 2006/0025115 A1 * | 2/2006 | Roy ............. 455/414.1 |
| 2006/0046765 A1 * | 3/2006 | Kogure ............. 455/522 |
| 2007/0001900 A1 * | 1/2007 | Heppe et al. ............. 342/357.08 |
| 2007/0077956 A1 * | 4/2007 | Julian et al. .................. 455/522 |
| 2007/0147289 A1 * | 6/2007 | Nibe ............. 370/329 |
| 2007/0149126 A1 * | 6/2007 | Rangan et al. ............... 455/63.1 |
| 2007/0191044 A1 * | 8/2007 | Kostic et al. .................. 455/522 |
| 2008/0259893 A1 * | 10/2008 | Murata et al. ................. 370/342 |
| 2009/0088164 A1 * | 4/2009 | Shen et al. .................... 455/436 |
| 2009/0154370 A1 * | 6/2009 | Yamaguchi ................... 370/252 |
| 2009/0196192 A1 * | 8/2009 | Lim et al. ...................... 370/252 |
| 2010/0110986 A1 * | 5/2010 | Nogami et al. ............... 370/328 |
| 2010/0124931 A1 * | 5/2010 | Eskicioglu et al. ........... 455/440 |
| 2010/0135174 A1 * | 6/2010 | Mori ............................. 370/252 |
| 2010/0216481 A1 * | 8/2010 | Gormley ....................... 455/450 |
| 2011/0098042 A1 * | 4/2011 | Mach et al. ................ 455/435.1 |
| 2012/0077499 A1 * | 3/2012 | Yoshihara .................. 455/435.2 |
| 2012/0082028 A1 * | 4/2012 | Kojima ......................... 370/230 |
| 2012/0122457 A1 * | 5/2012 | Murakami et al. ............ 455/436 |
| 2012/0220302 A1 * | 8/2012 | Ebara et al. ................... 455/437 |

FOREIGN PATENT DOCUMENTS

JP    2007-53437    3/2007

* cited by examiner

*Primary Examiner* — Otis L Thompson, Jr.
(74) *Attorney, Agent, or Firm* — Oblon, Spivak, McClelland, Maier & Neustadt, L.L.P.

(57) ABSTRACT

There is provided a radio communication terminal including a measurement execution section which measures, as a measurement value, strength or quality of a signal received by a reception circuit from a base station, a measurement report creation section which creates a measurement report containing the measurement value, an offset amount setting section which sets a correction amount based on a usage status of the radio communication terminal by a user, an offset correction section which calculates an output value by subtracting the correction amount set by the offset amount setting section from the measurement value measured by the measurement execution section, and a measurement report transmission timing control section which designates a timing of transmitting the measurement report created by the measurement report creation section based on the output value calculated by the offset correction section and a threshold.

12 Claims, 9 Drawing Sheets

RADIO COMMUNICATION TERMINAL, COMMUNICATION METHOD, AND RADIO COMMUNICATION SYSTEM

BACKGROUND OF THE INVENTION

1. Field of the Invention

The present invention relates to a radio communication terminal, a communication method, and a radio communication system.

2. Description of the Related Art

In 2002, 3G (which is called third-generation in Japan) mobile phone service started. At first, users mainly used applications each handling a packet which includes small-capacity content such as audio and mail. However, by introduction of HSDPA (High Speed Downlink Packet Access) and the like, the usage behaviors of users have shifted to downloading large-sized packets, for example, downloading music files, or viewing videos provided by YouTube (registered trademark).

In this way, with the increase in downloading packet capacity, radio networks have been expanded and also, a service of HSPA (High Speed Packet Access)+, which realizes up to 21 Mbps in terms of download speed, has been started. Further, in about 2010, an LTE (Long Term Evolution) service which employs OFDMA (Orthogonal Frequency Division Multiplexing Access) on the downlink, and in about 2015, a 4G service are scheduled to be started. A world is coming, where a maximum of 1 Gbps in a semifixed environment, and a maximum of 100 Mbps even in a mobile environment can be realized.

However, only a user who is located near a base station can receive the benefit of high communication rate radio environment described above, and, as the user approaches a cell edge, the communication rate decreases basically. Therefore, it is not necessarily easy to acquire a radio communication environment at stably high communication rate in a mobile environment within one radio communication system. Further, when considering that the use of receiving a video streaming service under high speed mobile environment such as inside a train will be increased in the future, there is desired a technique of handover which is capable of maintaining a high communication rate communication environment over multiple radio communication systems.

In order to simplify a description, a concept of handover which omits a concept of sector is shown in FIG. 7. For example, in the case where a W-CDMA (Wideband Code Division Multiple Access) type mobile terminal moves while talking thereon from a cell A_1 to a cell A_2 which receive W-CDMA service, the mobile terminal transmits/receives a signal to/from two base station at the same time in a area near a cell edge, and soft handover is performed in a manner that the mobile terminal moves into the cell A_2 without breaking the connection.

Further, as an extension function of W-CDMA, a service such as HSPA which provides a high rate packet communication environment is started, and an environment capable of performing large-capacity packet communication is being developed. Note that a function called AMC (Adaptive Modulation and Coding) used in HSPA is for increasing communication rate with respect to a user with better communication state by performing multiple transmission with multilevel modulation, high encoding ratio, and multiple orthogonal codes. Accordingly, it is difficult for a user to receive a high communication rate service in an area such as a cell edge where the reception state is not necessarily good.

Therefore, it is difficult for the user to move from the cell A_1 to the cell A_2 while continuing to receive a high communication rate service and to perform handover without being interrupted like in the case of audio communication. That is, it can be said that the present communication environment is an environment that can provide a service at a high communication rate under the case where the user does not move a lot, or is an environment that can provide a download service at an intermittently high communication rate even while the user is moving, such as web browsing.

FIG. 8 is a flowchart showing a procedure of general handover processing. First, when communication is started or handover is completed (Step 201), a radio communication terminal monitors the reception quality of a cell which performs communication (hereinafter, serving cell) at regular intervals (Step 202). When the reception quality of the serving cell exceeds a threshold ("Yes" in Step 206), only regular monitoring of the serving cell is continued. If the reception quality of the serving cell becomes equal to or lower than the threshold ("No" in Step 206), cell search processing for specifying a candidate neighbor cell is activated (Step 207).

When creation of a measurement report and report to a network side is performed (Step 208) and a candidate is specified from among neighbor cells in the network side (Step 209), a reception quality of the specified cell candidate is measured for a certain period of time (Step 210). When the reception quality of the serving cell is not enhanced and the reception quality of the specified cell candidate reaches a level that is determined by the base station side to perform handover ("Yes" in Step 211), an instruction to perform handover is issued from the base station side to the mobile terminal, and the handover is executed (Step 212).

Further, since the services such as LTE and 4G are planned in the future as described above, there will be developed radio communication paths which provide multiple high communication rates. In that case, as shown in FIG. 9, it is assumed that, at a cell edge of a cell A of a radio communication system, there may be built a cell B of a radio communication system which is different from the radio communication system of the cell A. Under such radio communication environment, there will be no problem in performing handover between the cell A_1 and the cell A_2 in the same manner as shown in FIG. 7 for services with low communication rate such as audio communication.

On the other hand, as for a high communication rate service, in the case where the radio communication terminal moves from the cell A_1 to the cell A_2, the following processing becomes possible: within the cell A_1, before reaching the cell edge, hard handover is performed to a cell B which provides a radio communication system which is different from the radio communication system of the cell A, to thereby maintain a high communication rate; and next, hard handover is performed to the cell A_2. In addition, more stable service can be provided by recognizing a present cell congestion state by the radio communication terminal, and by obtaining means to bring forward the timing of the handover depending on the congestion state. Accordingly, what is important is that the way in which a method of handover is changed depending on a service, and, in addition, a congestion degree of the present cell.

Further, for example, there is disclosed a technology in which an incoming call rate is enhanced even in the case where electric field intensity currently being received is in a weak electric field state to an extent that it cannot normally receive a paging channel (for example, refer to JP-A-2007-53437). According to the technology, in a standby mode, a cellular phone terminal measures an electric field intensity of a currently receiving cell and an electric field intensity of a monitoring cell, and in the case where it is determined that the electric field intensity of the currently receiving cell is weaker than a threshold, the cellular phone terminal determines that the incoming signal strength of the currently receiving cell is not an environment which can normally receive the paging channel. The cellular phone terminal determines whether a cell having an electric field intensity stronger than the electric field intensity of the currently receiving cell is present. In the case where it is determined that a cell having an electric field intensity stronger than the electric field intensity of the currently receiving cell is present, the cellular phone terminal performs cell-reselection operation, in which a cell for receiving the paging channel is switched from the currently receiving cell to the monitoring cell that is determined to have high reception strength.

SUMMARY OF THE INVENTION

According to the technology disclosed in JP-A-2007-53437, when the electric field intensity of the currently receiving cell weakens, a cell for receiving the paging channel can be switched to a cell having stronger electric field intensity. However, the technology is not for switching cells in the case where the electric field intensity of the currently receiving cell is not weakened. Therefore, there was an issue that it was difficult to switch cells depending on a usage status of a terminal by a user.

In light of the foregoing, it is desirable to provide a novel and improved technology which enables to switch cells depending on the usage status of the terminal by the user.

According to an embodiment of the present invention, there is provided a radio communication terminal which includes a reception section which receives a signal from a base station, a measurement execution section which measures, as a measurement value, strength or quality of the signal received by the reception section from the base station, a measurement report creation section which creates a measurement report containing the measurement value, a correction amount setting section which sets a correction amount based on a usage status of the radio communication terminal by a user, a correction section which calculates an output value by correcting a threshold or the measurement value measured by the measurement execution section using the correction amount set by the correction amount setting section, a transmission timing control section which designates a timing of transmitting the measurement report created by the measurement report creation section based on the output value and the measurement value when the threshold is corrected by the correction section, or based on the output value and the threshold when the measurement value is corrected by the correction section, and a transmission section which transmits the measurement report to the base station in accordance with the timing designated by the transmission timing control section.

The correction section may calculate an output value by subtracting the correction amount set by the correction amount setting section from the measurement value measured by the measurement execution section. The transmission timing control section may designate a timing of transmitting the measurement report created by the measurement report creation section based on the output value calculated by the correction section and the threshold.

The radio communication terminal may further include an application execution section which executes an application. The correction amount setting section may set the correction amount depending on a kind of the application which is executed by the application execution section.

The radio communication terminal may further include an application execution section which executes an application. The correction amount setting section may set the correction amount depending on a resolution of an image handled by the application which is executed by the application execution section.

The radio communication terminal may further include an application execution section which executes an application. The correction amount setting section may set the correction amount depending on a time period in which the application is executed by the application execution section.

When the output value calculated by the correction section is equal to or less than the threshold, the transmission timing control section may issue an instruction to transmit the measurement report created by the measurement report creation section.

The correction section may calculate an output value by adding the correction amount set by the correction amount setting section to the threshold. The transmission timing control section may designate a timing of transmitting the measurement report created by the measurement report creation section based on the output value calculated by the correction section and the measurement value.

The measurement report creation section may create a measurement report containing the output value calculated by the correction section.

The radio communication terminal may further include a congestion state calculation section which calculates a usage rate of a radio resource. The correction amount setting section may set the correction amount depending on a kind of the application executed by the application execution section and the usage rate of the radio resource calculated by the congestion state calculation section.

The radio communication terminal may further include a position information detection section which detects position information indicating a position of the radio communication terminal, and a handover history information storage section which stores handover history information in which position information is correlated with information indicating necessity or unnecessity of handover at the position. The correction amount setting section may set the correction amount based on a kind of the application which is executed by the application execution section, position information which is detected by the position information detection section, and the handover history information.

According to another embodiment of the present invention, there is provided a communication method which includes the steps of receiving a signal from a base station, measuring, as a measurement value, strength or quality of the signal, creating a measurement report containing the measurement value, setting a correction amount based on a usage status of the radio communication terminal by a user, calculating an output value by correcting a threshold or the measurement value using the correction amount, designating a timing of transmitting the measurement report based on the output value and the measurement value when the threshold is corrected, or based on the output value and the threshold when the measurement value is corrected, and transmitting the measurement report to the base station in accordance with the timing.

According to another embodiment of the present invention, there is provided a radio communication system which includes a base station and a radio communication terminal. The radio communication terminal includes a reception section which receives a signal from a base station, a measurement execution section which measures, as a measurement value, strength or quality of the signal received by the reception section from the base station, a measurement report creation section which creates a measurement report containing the measurement value, a correction amount setting section which sets a correction amount based on a usage status of the radio communication terminal by a user, a correction section which calculates an output value by correcting a threshold or the measurement value measured by the measurement execution section using the correction amount set by the correction amount setting section, a transmission timing control section which designates a timing of transmitting the measurement report created by the measurement report creation section based on the output value and the measurement value when the threshold is corrected by the correction section, or based on the output value and the threshold when the measurement value is corrected by the correction section, and a transmission section which transmits the measurement report to the base station in accordance with the timing designated by the transmission timing control section. The base station includes a transmission section which transmits the signal to the radio communication terminal, and a reception section which receives the measurement report from the radio communication terminal.

According to the embodiments of the present invention described above, it is possible to switch cells depending on a usage status of a terminal by a user.

DETAILED DESCRIPTION OF THE EMBODIMENTS

Figure 1:
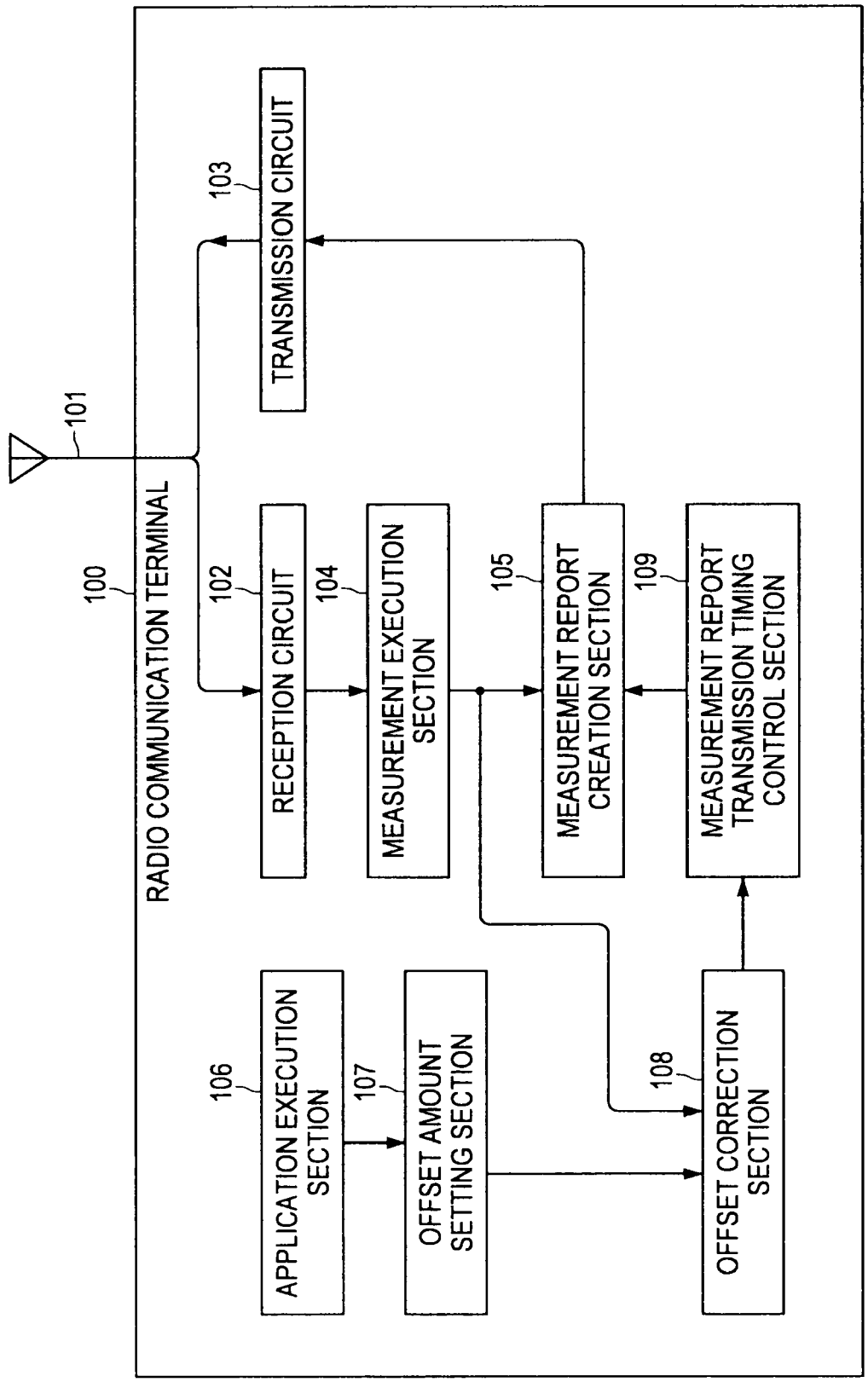
FIG. 1 is a diagram showing a configuration of a radio communication terminal according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the description will be given in the following order.

1. First Embodiment
   1-1. Configuration of Radio Communication Terminal
   1-2. Configuration of Radio Communication System 2. Second Embodiment
   2-1. Configuration of Radio Communication Terminal
3. Third Embodiment
   3-1. Configuration of Radio Communication Terminal
4. Fourth Embodiment
   4-1. Configuration of Radio Communication Terminal
5. Modified Example
6. Summary <1. First Embodiment>

A first embodiment of the present invention will be described.

[1-1. Configuration of Radio Communication Terminal]

FIG. 1 is a diagram showing a configuration of a radio communication terminal according to the first embodiment of the present invention. With reference to FIG. 1, the radio communication terminal according to the embodiment will be described. According to 3GPP TS 36.331 "3rd Generation Partnership Project; Technical Specification Group Radio Access Network; E-UTRA; RRC; Protocol specification", and 3GPP TS 36.133 "3rd Generation Partnership Project; Requirements for support of radio resource management", the handover has the following procedure: measuring reception strength and the like of each base station by a UE (User Equipment); reporting the measurement results to an E-UTRAN (Evolved Universal Terrestrial Radio Access Network) as a measurement report; performing the determination of the handover at the E-UTRAN side; and instructing the UE side to perform the handover. That is, in the standard described above, a network-led handover mechanism is used, and, in particular, in order to execute lossless handover in which the loss of data does not occur before and after the handover, it is necessary that the UE operates as instructed from the network side.

A radio communication terminal 100 has an antenna 101, a reception circuit 102, and a transmission circuit 103. The radio communication terminal 100 performs exchange of signals with a base station by using the antenna 101, the reception circuit 102, and the transmission circuit 103. More specifically, the reception circuit 102 receives a signal from the base station via the antenna 101, and outputs the received signal to a measurement execution section 104. The transmission circuit 103 transmits a signal output from a measurement report creation section 105 to the base station via the antenna 101. The reception circuit 102 functions as an example of a reception section and the transmission circuit 103 functions as an example of a transmission section. The antenna 101 used by the reception circuit 102 and the antenna 101 used by the transmission circuit 103 may be the same or different from each other.

Further, the radio communication terminal 100 has the measurement execution section 104 and the measurement report creation section 105. The measurement execution section 104 has a function of measuring strength and quality of the signal output from the reception circuit 102 as measurement values. The signal strength is measured as RSRP (Reference Signal Received Power), and the signal quality is measured as RSRQ (Reference Signal Received Quality). At least one of those measurement values is output to the measurement report creation section 105. Hereinafter, a case where the signal strength (received electric energy) is used as a measurement valued is described, but the measurement value is not limited thereto. The measurement report creation section 105 creates a measurement report based on the measurement value output from the measurement execution section 104, and transmits the measurement report to the base station via the transmission circuit 103. The measurement report includes a measurement value, and is used for determination of handover, for example.

Further, the radio communication terminal 100 has an application execution section 106 which executes an application and an offset amount setting section 107 which sets offset electric energy depending on the kind of the application. The offset amount setting section 107 has a function of setting the offset electric energy based on the usage status of the radio communication terminal 100 by the user. For example, in the case of executing an application that handles video streaming which continues to require a high communication rate in the application execution section 106, the offset amount setting section 107 increases the offset electric energy. Here, although a typical example of the video streaming which continues to require a high communication rate includes the viewing service of YouTube (registered trademark), the examples are not limited to the video streaming viewing service. The typical examples cover entire applications each continuing to require a high communication rate. Further, the offset electric energy may be altered based on, in addition to the kind of application, information related to a communication rate which is required at the time of communication. For example, even in the case of the same application as described above (e.g., YouTube (registered trademark)), the offset electric energy may be altered based on whether the video to be handled has high resolution or low resolution. Further, the offset electric energy may be altered based on, in addition to the kind of application, a time period in which the application is used. The offset electric energy is an example of a correction amount. Further, the offset amount setting section 107 functions as an example of a correction amount setting section.

In more detail, the radio communication terminal 100 may include a storage section (not shown) which stores information in which the usage status by the user (e.g., a kind of application, and time period in which the application is used) is correlated with the offset electric energy, for example. Accordingly, the offset amount setting section 107 can acquire the offset electric energy corresponding to the usage status by the user from the information stored in the storage section (not shown). As the kind of the application, there may be used application identification information which is added to the application, for example. As the time period in which the application is used, there may be used a time period acquired from, based on the current time, a clock built in the radio communication terminal 100. In this case, for example, assuming that the storage section (not shown) stores information in which the time is correlated with the time period, the offset amount setting section 107 may acquire the time period from the information.

In addition, the radio communication terminal 100 has an offset correction section 108. The offset correction section 108 performs an operation of subtracting the offset electric energy, which is output from the offset amount setting section 107, from the measurement value, which is output from the measurement execution section 104. After that, an output value from the offset correction section 108 is output to a measurement report transmission timing control section 109. The offset correction section 108 functions as an example of a correction section. Note that, as will be described below in the modified example, the offset correction section 108 may calculate an output value by performing an operation of adding the offset electric energy, which is output from the offset amount setting section 107, to a threshold, and may output the calculated output value to the measurement report transmission timing control section 109. That is, the offset correction section 108 calculates the output value by correcting the threshold or the measurement value measured by the measurement execution section 104 with the correction amount set by the offset amount setting section 107.

The measurement report transmission timing control section 109 has a function of instructing the measurement report creation section 105 of the timing at which the measurement report created by the measurement report creation section 105 is transmitted based on a set value (threshold) designated by the network side and the output value from the offset correction section 108. In the case where the output value is equal to or less than the threshold, the measurement report transmission timing control section 109 issues, to the measurement report creation section 105, an instruction to transmit the measurement report in the conditions as designated from the network side. The measurement report is transmitted by the measurement report creation section 105 to the base station via the transmission circuit 103. Accordingly, a timing of transmitting the measurement report can be brought forward depending on the usage status of the radio communication terminal 100 by the user. As a result, a timing of activating a monitoring function of a peripheral cell for handover can be brought forward, and, when there is found a cell with good reception conditions which supports communication of another radio communication system, handover can be performed while maintaining a high communication rate. The measurement report transmission timing control section 109 functions as an example of a transmission timing control section. Note that, as will be described below in the modified example, there is also assumed a case where the offset correction section 108 corrects a threshold. That is: in the case where the threshold is corrected by the offset correction section 108, the measurement report transmission timing control section 109 designates a timing of transmitting the measurement report based on the output value from the offset correction section 108 and the measurement value; and in the case where the measurement value is corrected by the offset correction section 108, the measurement report transmission timing control section 109 designates a timing of transmitting the measurement report based on the output value from the offset correction section 108 and the threshold.

[1-2. Configuration of Radio Communication System]

Figure 2:
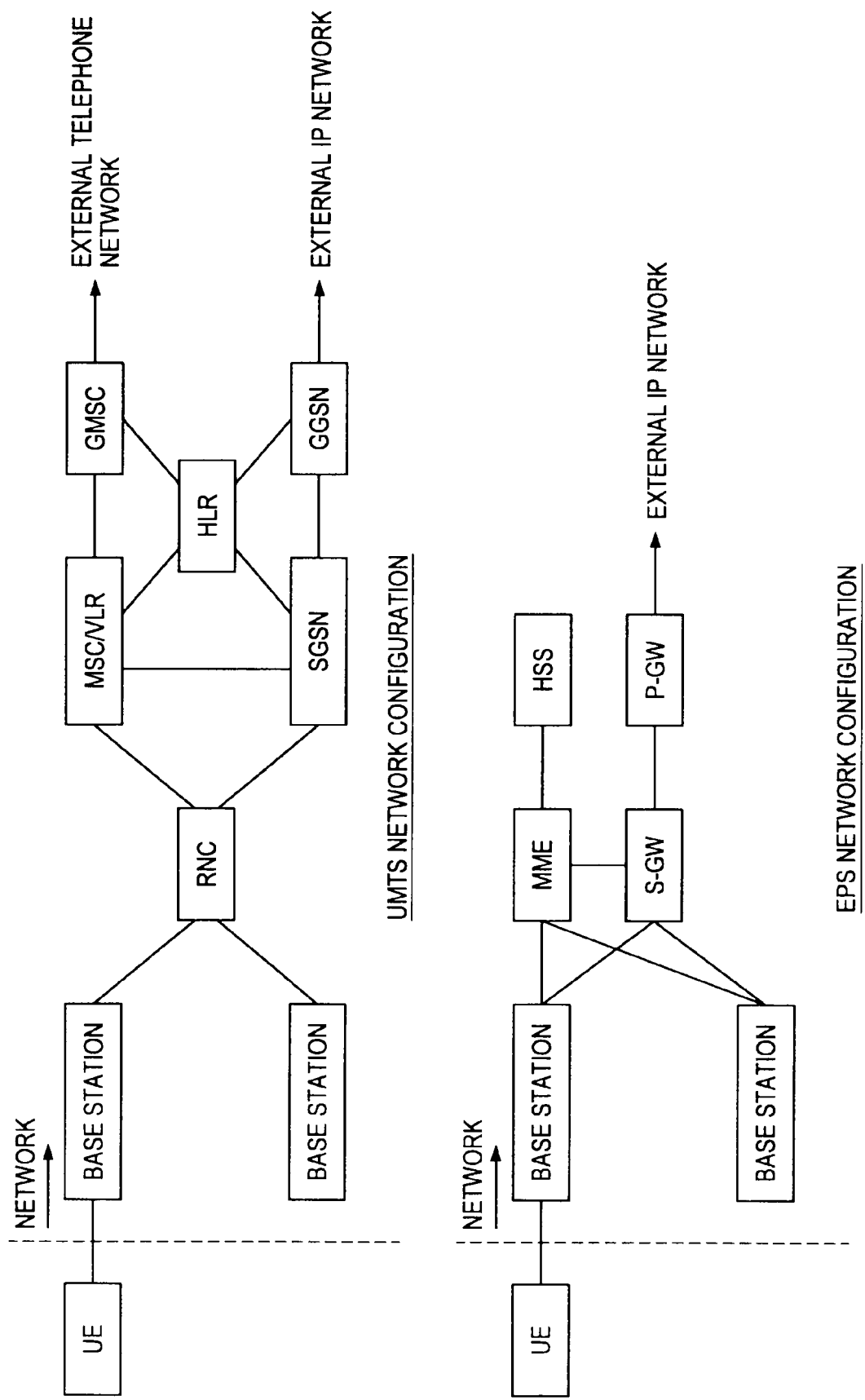
FIG. 2 is a diagram showing a configuration example of the radio communication system according to the embodiment.

FIG. 2 is a diagram showing a configuration example of the radio communication system according to the present embodiment. With reference to FIG. 2, the configuration example of the radio communication system according to the present embodiment will be described. In the example, there are shown a configuration example of a UMTS (Universal Mobile Telecommunications System) network and a configuration example of an EPS (Evolved Packet System) network used by the LTE. The radio communication system according to the present embodiment may have the UMTS network configuration, the EPS network configuration, or another configuration. The description of "network side" in the present specification refers to the base station and core network sides shown in FIG. 2.

The UMTS network includes: a base station; an RNC (Radio Network Controller); an SGSN (Serving GPRS Support Node) and a GGSN (Gateway GPRS Support Node) which configure a packet network; an MSC (Mobile Switching Centre), a VLR (Visitor Location Register), and a GMSC (Gateway MSC) which configure a line switching network; and HLR (Home Location Register).

The LTE network includes a base station, an S-GW (Serving GateWay), a P-GW (Packet Data Network GateWay), an MME (Mobile Management Entity), and an HSS (Home Subscriber Server). For example, in the LTE, "Measurement objects" which define measurement items to be performed by the UE, "Reporting configurations" which transmit details of information to be reported by the UE, and the like are transmitted from the base station to the UE by using "RRCConnectionReconfiguration Message". Further, "MeasurementReport Message" is used for the transmission from the UE to the base station.

Figure 3:
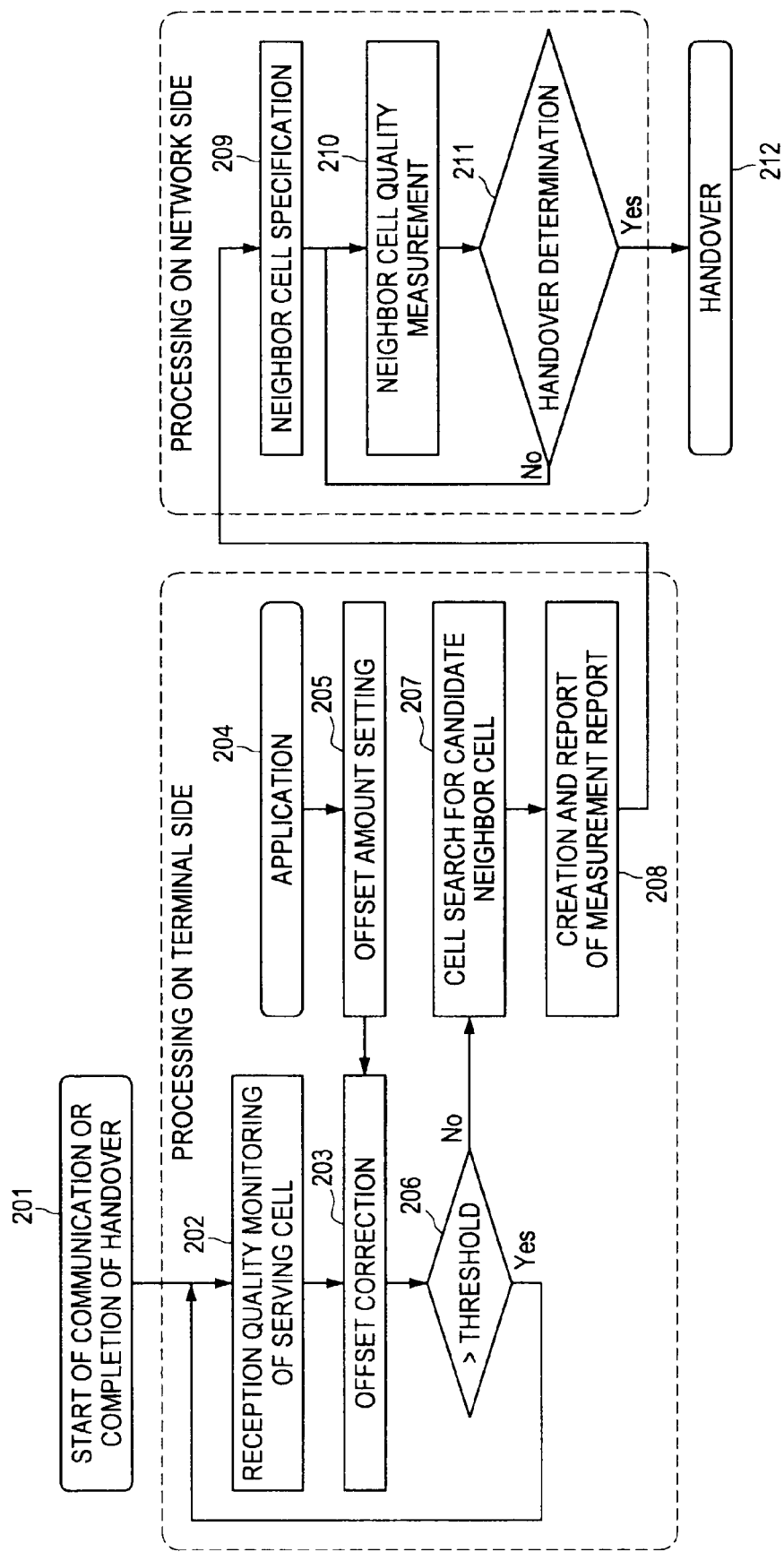
FIG. 3 is a diagram showing a procedure of handover which is performed by the radio communication terminal and a network according to the embodiment.

FIG. 3 is a diagram showing a procedure of handover which is performed by the radio communication terminal 100 shown in FIG. 1 and a network including a base station. The threshold used in a determination (Step 206) is designated from the network side. The determination (Step 206) is not for controlling the timing itself of the handover, but is for controlling a trigger for transmitting the measurement report to the network side. Based on the relationship between a signal reception level from the base station and a threshold, the measurement report is transmitted to the network side, and a cell search 207 for a candidate neighbor cell is activated. Here, in the case where an offset amount setting 205 is performed depending on an application 204 and an application which continues to require a high communication rate as described above is activated, offset electric energy is subtracted from the RSRP and the RSRQ measured by the reception quality monitoring 202 of a serving cell in offset correction 203, and after that, the resultant is compared with the threshold.

The measurement report is transmitted to the network side when the measurement report is equal to or less than the threshold, the timing of the activation of cell search 207 for candidate neighbor cell can be brought forward. After creation and report 208 of the measurement report with respect to the candidate neighbor cell and neighbor cell specification 209 are performed, neighbor cell quality measurement 210 with respect to the neighbor cell is performed. In the neighbor cell quality measurement 210, the RSRP and the RSRQ from the neighbor cell in the radio communication terminal are measured in the same manner as in the case of the serving cell, and are transmitted to the network side as a measurement report. When handover determination 211 is performed in the network side and the quality of the neighbor cell satisfies the conditions of handover, handover 212 is executed. From the above, the processing of correcting a received power measurement value of the serving cell does not necessarily aim at performing radio communication terminal 100-led handover, and the processing aims at bringing forward the timing of activating the cell search 207 for candidate neighbor cell by controlling the timing of transmitting the measurement report to be reported to the network side from the radio communication terminal 100 depending on an application.

<2. Second Embodiment>

Subsequently, a second embodiment of the present invention will be described.

[2-1. Configuration of Radio Communication Terminal]

Figure 4:
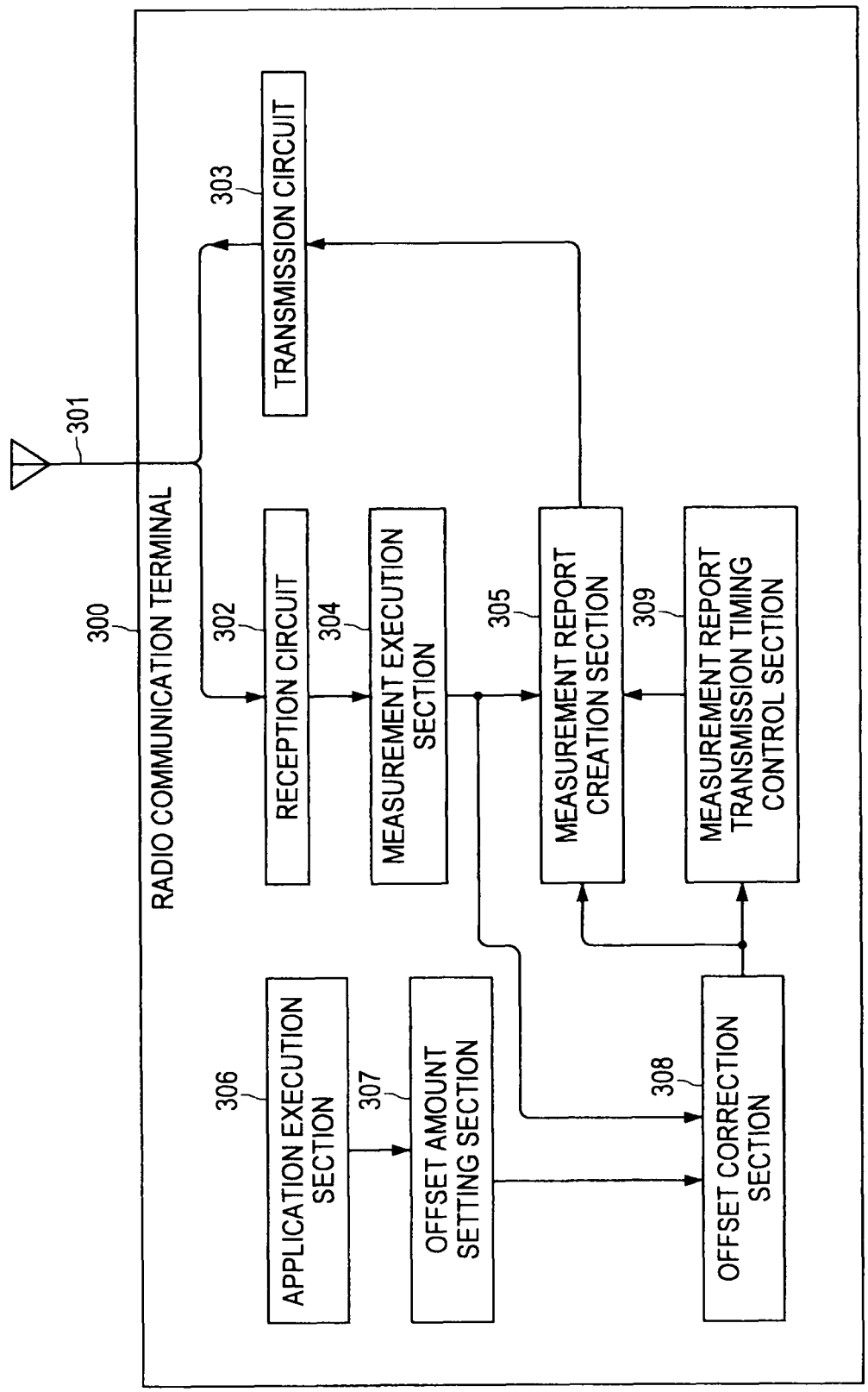
FIG. 4 is a diagram showing a configuration of a radio communication terminal according to a second embodiment of the present invention.

FIG. 4 is a diagram showing a configuration of a radio communication terminal 300 according to a second embodiment. The description that overlaps with that of the configuration of the radio communication terminal 100 according to the first embodiment shown in FIG. 1 will be omitted, and mainly, there will be added a description on difference between the configuration of the radio communication terminal 300 and the configuration of the radio communication terminal 100. The radio communication terminal 300 has an application execution section 306 and an offset amount setting section 307. A power value from which offset power is subtracted in an offset correction section 308 is output to a measurement report creation section 305 as a measurement value of the serving cell. Therefore, it is reported to the network side that the received power of the serving cell is equivalently decreasing. Accordingly, a timing of transmitting the measurement report and a timing of activating a monitoring function of a peripheral cell for handover can be brought forward depending on an application, and, when there is found a cell with good reception conditions which supports communication of another radio system, handover can be performed while maintaining a high communication rate. What is important herein is that the offset correction is not provided with respect to the report of the received power measurement value related to the neighbor cell candidate, and that the report is reported to the network while maintaining the measured accuracy. It is necessary that the evaluation of a cell at a handover destination be performed correctly at the network side.

<3. Third Embodiment>

Subsequently, a third embodiment of the present invention will be described.

[3-1. Configuration of Radio Communication Terminal]

Figure 5:
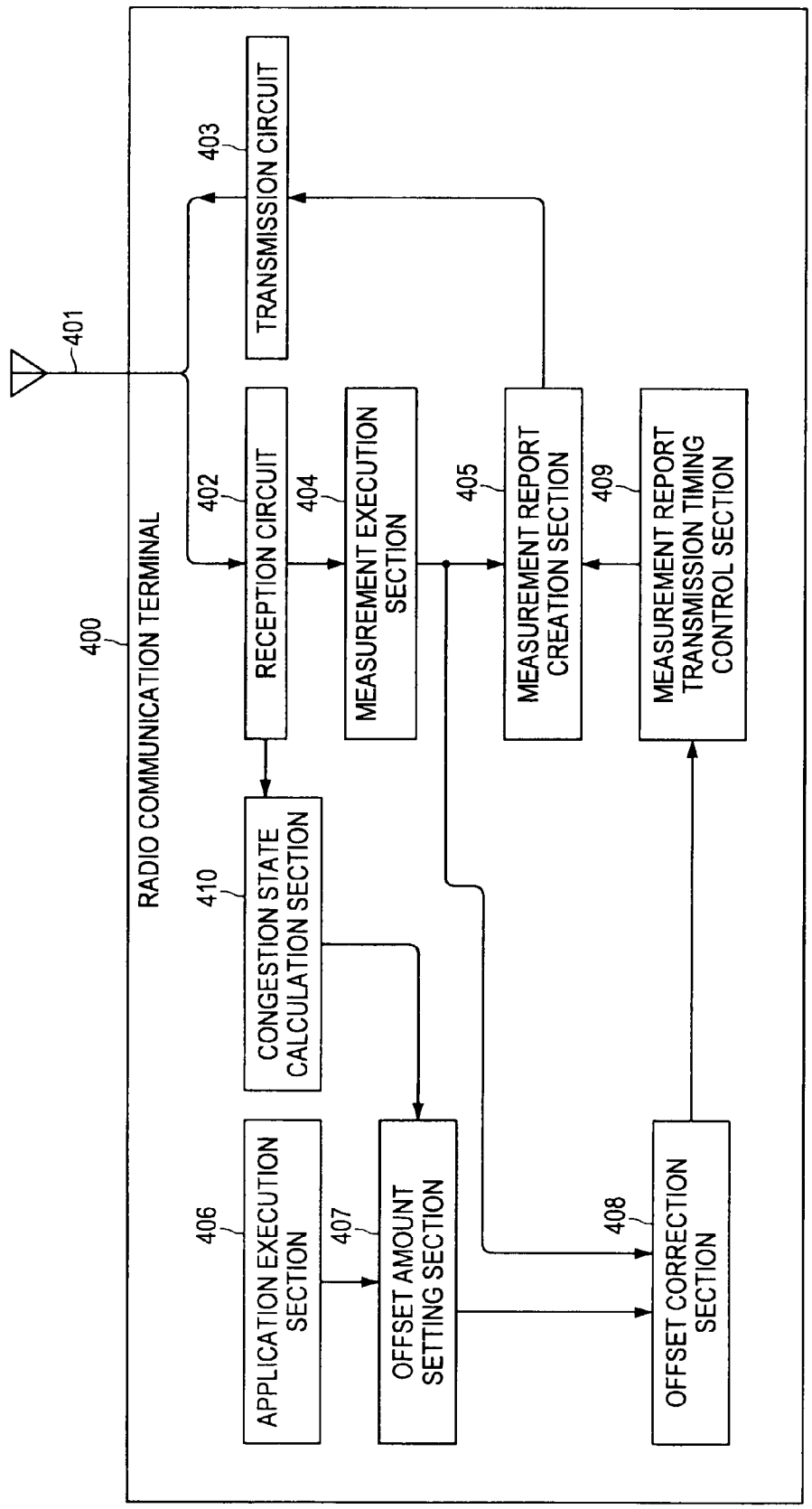
FIG. 5 is a diagram showing a configuration of a radio communication terminal according to a third embodiment of the present invention.

FIG. 5 is a diagram showing a configuration of a radio communication terminal 400 according to a third embodiment. The description that overlaps with that of the configuration shown in FIG. 1 will be omitted, and mainly, there will be added a description on difference between the configuration shown in FIG. 5 and the configuration shown in FIG. 1. The radio communication terminal 400 has a congestion state calculation section 410, which serves as an index, together with an application execution section 406, for setting offset electric energy of an offset amount setting section 407. For example, in the case where are many users currently performing communication and a usage rate of radio resource is high, the rate of the radio resource allocated to the radio communication terminal 400 is decreased, and as a result, the communication rate decreases. In this case, a timing of activating a monitoring function of a peripheral cell for handover can be brought forward, and, when there is found a cell with good reception conditions which supports communication of another radio system, handover can be performed while maintaining a high communication rate. Note that, in W-CDMA type for example, the congestion state calculation section 410 can be implemented into the radio communication terminal 400 by using a technique utilizing correlation detection in peripheral cell search.

<4. Fourth Embodiment>

Subsequently, a fourth embodiment of the present invention will be described.

[4-1. Configuration of Radio Communication Terminal]

Figure 6:
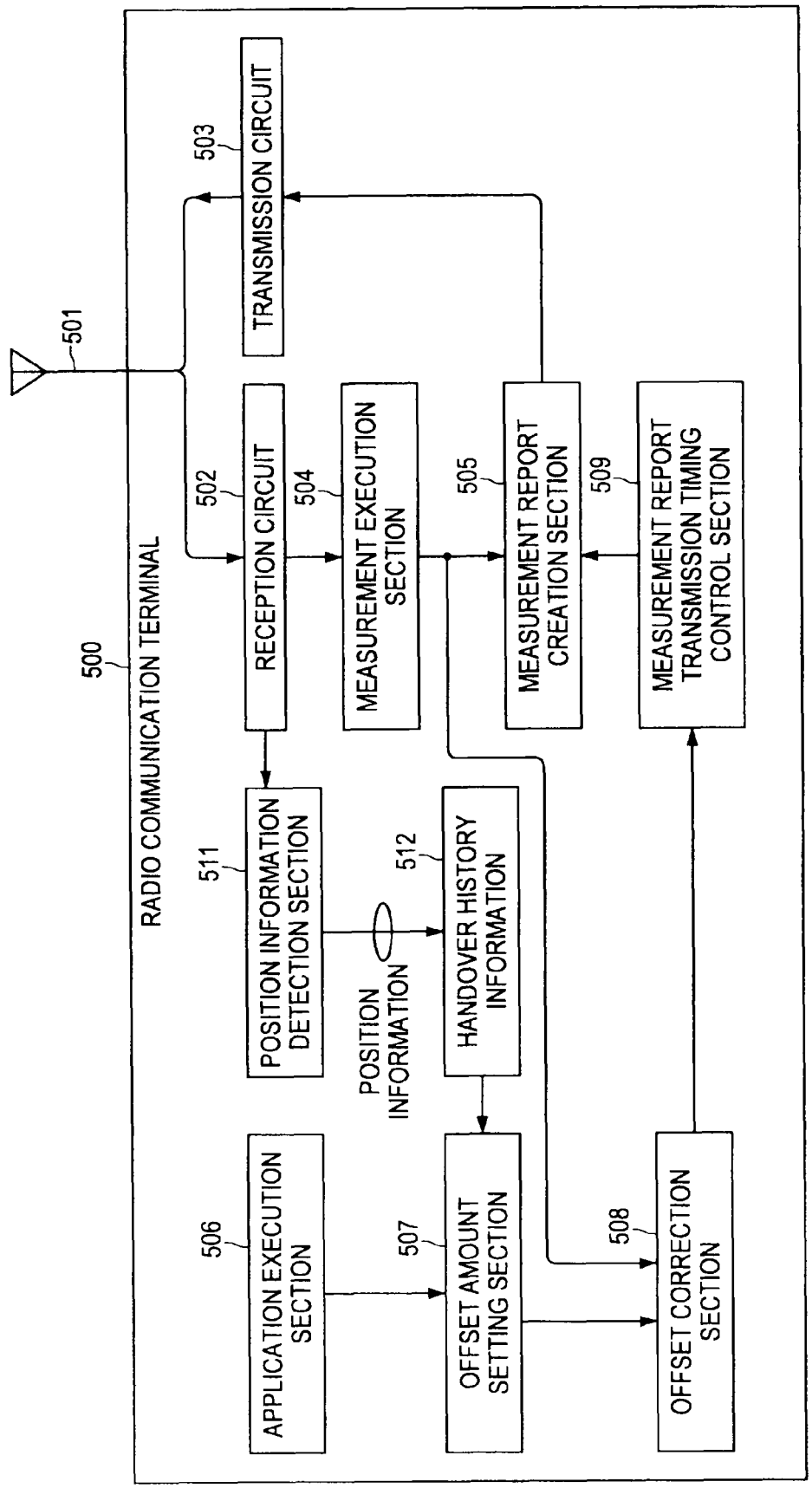
FIG. 6 is a diagram showing a configuration of a radio communication terminal according to a fourth embodiment of the present invention.
Figure 7:
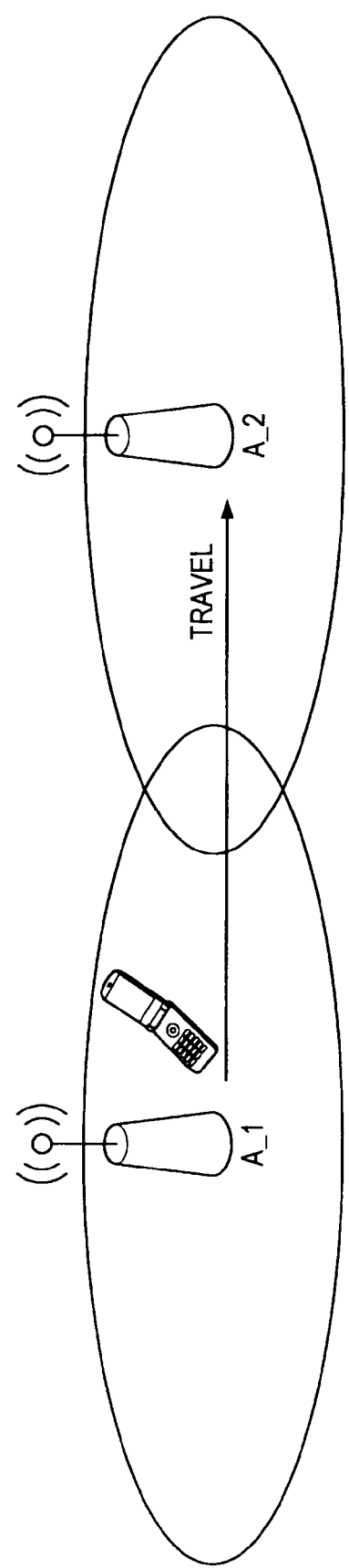
FIG. 7 is a diagram showing a concept of handover.
Figure 8:
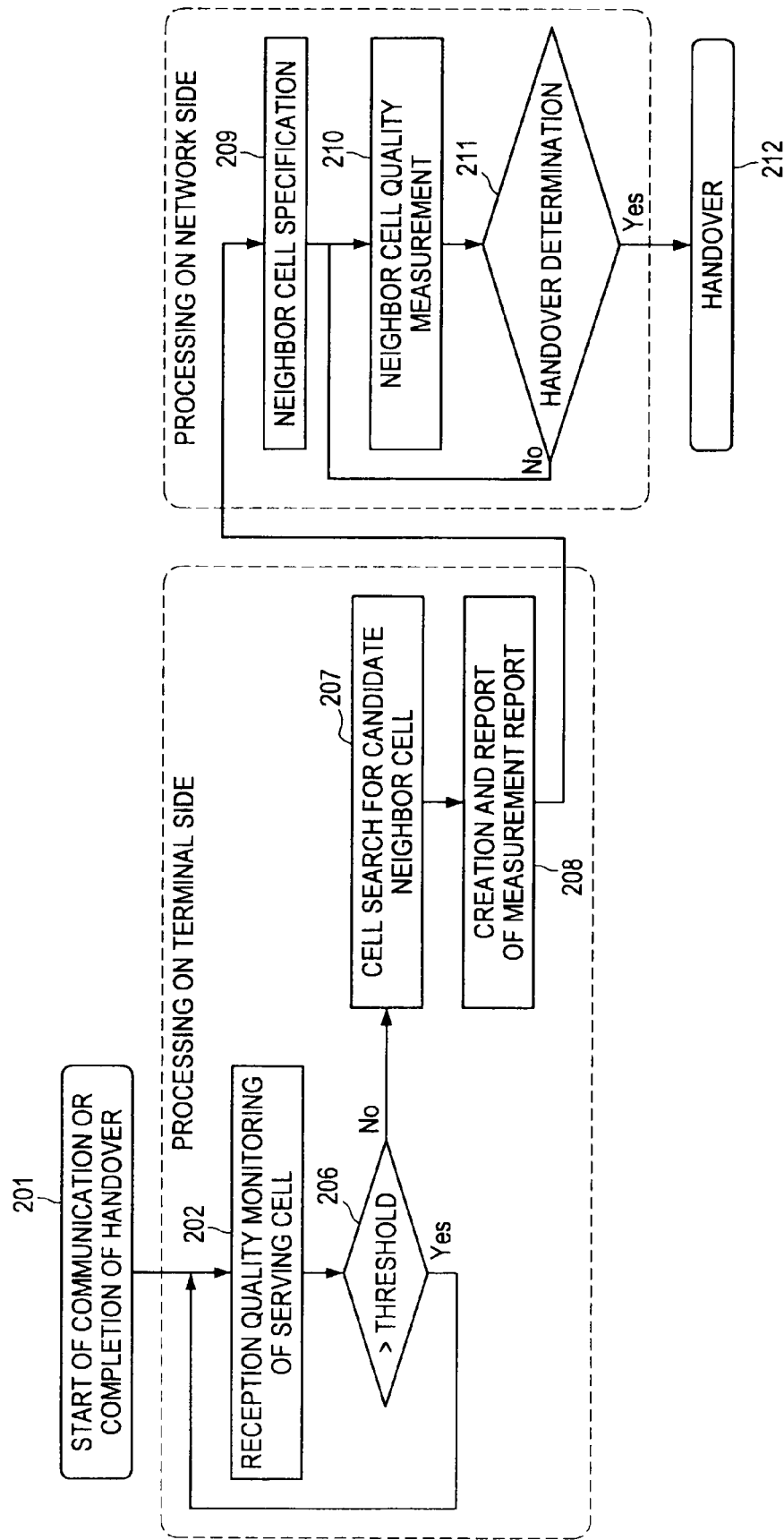
FIG. 8 is a flowchart showing a procedure of general handover processing.
Figure 9:
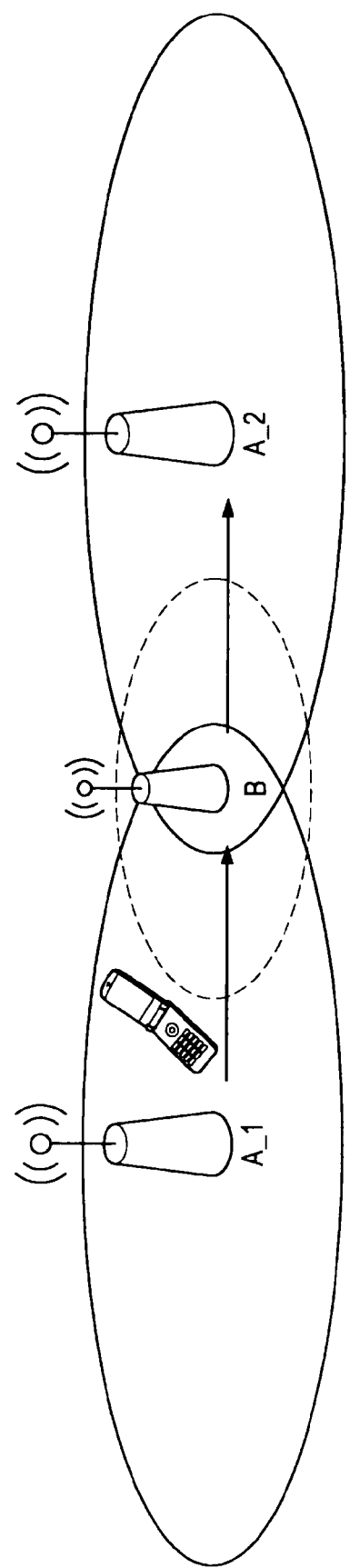
FIG. 9 is a diagram showing another concept of handover.

FIG. 6 is a diagram showing a configuration of a radio communication terminal 500 according to a fourth embodiment. The description that overlaps with that of the configuration shown in FIG. 1 will be omitted, and mainly, there will be added a description on difference between the configuration shown in FIG. 6 and the configuration shown in FIG. 1. The radio communication terminal 500 has a position information detection section 511. The position information detection section 511 can be realized by mounting a GPS (Global Positioning System) receiver on the radio communication terminal 500, for example. Further, the position information detection section 511 can also use an ID (base station ID) for identifying a base station included in the signal received from a base station as position information. The radio communication terminal 500 has handover history information 512. The handover history information 512 is stored in a handover history information storage section (not shown), for example.

The handover history information 512 has information of whether or not it is better to perform handover to position information supplied from the position information detection section 511, and serves as an index for setting offset electric energy of an offset amount setting section 507. For example, when the radio communication terminal 500 determines, based on the handover history information 512, that it is an area where handover is to be performed, a timing of transmitting the measurement report can be brought forward by increasing the offset electric energy of the offset amount setting section 507. As a result, a timing of activating a monitoring function of a peripheral cell for handover can be brought forward.

Here, the handover history information 512 can be configured by, for example, when the handover was performed correctly in the past, causing the position information detection section 511 to retain, in the handover history information storage section, a combination of position information and a flag indicating that the handover was performed. In addition, more accurate history information can be realized by causing the handover history information storage section to retain measurement results of a serving cell and a neighbor cell in combination. For example, the position information detection section 511 compares current position information with the position information included in the handover history information at regular intervals, and in the case where the distance between the current position and the position included in the handover history information becomes equal to or less than a predetermined distance, the offset electric energy is set based on the corresponding handover history information.

Note that it goes without saying that the handover history information 512 can be configured by the history of the radio communication terminal 500 itself, or is available by means of downloading from the Internet, an external memory, and the like.

<5. Modified Example>

It should be understood by those skilled in the art that various modifications, combinations, sub-combinations and alterations may occur depending on design requirements and other factors insofar as they are within the scope of the appended claims or the equivalents thereof.

For example, in the embodiment described above, the offset correction section 108 performs an operation of subtracting the offset electric energy, which is output from the offset amount setting section 107, from the measurement value, which is output from the measurement execution section 104. However, the offset correction section 108 may also calculate an output value by performing an operation of adding the offset electric energy, which is output from the offset amount setting section 107, to a threshold, and may output the calculated output value to the measurement report transmission timing control section 109. Further, in this case, the measurement report transmission timing control section 109 may designate a timing of transmitting the measurement report based on the output value from the offset correction section 108 and the measurement value measured by the measurement execution section 104. In more detail, in the case where the measurement value measured by the measurement execution section 104 is equal to or less than the output value calculated by the offset correction section 108 for example, the measurement report transmission timing control section 109 may issue an instruction to transmit the measurement report created by the measurement report creation section 105.

<6. Summary>

According to the embodiments of the present invention, the radio communication terminal can bring forward a timing of transmitting the measurement report depending on the usage status of the radio communication terminal by the user. As a result, a timing of activating a monitoring function of a peripheral cell for handover can be brought forward, and, when there is found a cell with good reception conditions which supports communication of another radio communication system, handover can be performed while maintaining a high communication rate.

The present application contains subject matter related to that disclosed in Japanese Priority Patent Application JP 2009-264241 filed in the Japan Patent Office on Nov. 19, 2009, the entire content of which is hereby incorporated by reference.

What is claimed is:

1. A radio communication terminal comprising:
   a reception section which receives a signal from a base station;
   a measurement execution section which measures, as a measurement value, strength or quality of the signal received by the reception section from the base station;
   a measurement report creation section which creates a measurement report containing the measurement value;
   a correction amount setting section which sets a correction amount based on a usage status of the radio communication terminal by a user;
   a correction section which calculates an output value by correcting a threshold or the measurement value measured by the measurement execution section using the correction amount set by the correction amount setting section;
   a transmission timing control section which designates a timing of transmitting the measurement report created by the measurement report creation section based on the output value and the measurement value when the threshold is corrected by the correction section, or based on the output value and the threshold when the measurement value is corrected by the correction section; and
   a transmission section which transmits the measurement report to the base station in accordance with the timing designated by the transmission timing control section.

2. The radio communication terminal according to claim 1, wherein the correction section calculates an output value by subtracting the correction amount set by the correction amount setting section from the measurement value measured by the measurement execution section, and
   wherein the transmission timing control section designates a timing of transmitting the measurement report created by the measurement report creation section based on the output value calculated by the correction section and the threshold.

3. The radio communication terminal according to claim 1, further comprising
   an application execution section which executes an application,
   wherein the correction amount setting section sets the correction amount depending on a kind of the application which is executed by the application execution section.

4. The radio communication terminal according to claim 1, further comprising
   an application execution section which executes an application,
   wherein the correction amount setting section sets the correction amount depending on a resolution of an image handled by the application which is executed by the application execution section.

5. The radio communication terminal according to claim 1, further comprising
   an application execution section which executes an application, wherein the correction amount setting section sets the correction amount depending on a time period in which the application is executed by the application execution section.

6. The radio communication terminal according to claim 1, wherein, when the output value calculated by the correction section is equal to or less than the threshold, the transmission timing control section issues an instruction to transmit the measurement report created by the measurement report creation section.

7. The radio communication terminal according to claim 1, wherein the correction section calculates an output value by adding the correction amount set by the correction amount setting section to the threshold, and
wherein the transmission timing control section designates a timing of transmitting the measurement report created by the measurement report creation section based on the output value calculated by the correction section and the measurement value.

8. The radio communication terminal according to claim 1, wherein the measurement report creation section creates a measurement report containing the output value calculated by the correction section.

9. The radio communication terminal according to claim 1, further comprising
a congestion state calculation section which calculates a usage rate of a radio resource,
wherein the correction amount setting section sets the correction amount depending on a kind of the application executed by the application execution section and the usage rate of the radio resource calculated by the congestion state calculation section.

10. The radio communication terminal according to claim 1, further comprising:
a position information detection section which detects position information indicating a position of the radio communication terminal; and
a handover history information storage section which stores handover history information in which position information is correlated with information indicating necessity or unnecessity of handover at the position,
wherein the correction amount setting section sets the correction amount based on a kind of the application which is executed by the application execution section, position information which is detected by the position information detection section, and the handover history information.

11. A communication method, comprising the steps of:
receiving a signal from a base station;
measuring, as a measurement value, strength or quality of the signal;
creating a measurement report containing the measurement value;
setting a correction amount based on a usage status of the radio communication terminal by a user;
calculating an output value by correcting a threshold or the measurement value using the correction amount;
designating a timing of transmitting the measurement report based on the output value and the measurement value when the threshold is corrected, or based on the output value and the threshold when the measurement value is corrected; and
transmitting the measurement report to the base station in accordance with the timing.

12. A radio communication system comprising:
a base station; and
a radio communication terminal,
wherein the radio communication terminal includes
a reception section which receives a signal from a base station,
a measurement execution section which measures, as a measurement value, strength or quality of the signal received by the reception section from the base station,
a measurement report creation section which creates a measurement report containing the measurement value,
a correction amount setting section which sets a correction amount based on a usage status of the radio communication terminal by a user,
a correction section which calculates an output value by correcting a threshold or the measurement value measured by the measurement execution section using the correction amount set by the correction amount setting section,
a transmission timing control section which designates a timing of transmitting the measurement report created by the measurement report creation section based on the output value and the measurement value when the threshold is corrected by the correction section, or based on the output value and the threshold when the measurement value is corrected by the correction section, and
a transmission section which transmits the measurement report to the base station in accordance with the timing designated by the transmission timing control section, and
wherein the base station includes
a transmission section which transmits the signal to the radio communication terminal, and
a reception section which receives the measurement report from the radio communication terminal.

* * * * *